United States Patent
Jiang et al.

(10) Patent No.: US 9,601,278 B2
(45) Date of Patent: Mar. 21, 2017

(54) SUPER-CAPACITOR WITH SEPARATOR AND METHOD OF PRODUCING THE SAME

(71) Applicant: Analog Devices, Inc., Norwood, MA (US)

(72) Inventors: Yingqi Jiang, Woburn, MA (US); Kuang L. Yang, Newton, MA (US)

(73) Assignee: Analog Devices, Inc., Norwood, MA (US)

( * ) Notice: Subject to any disclaimer, the term of this patent is extended or adjusted under 35 U.S.C. 154(b) by 41 days.

(21) Appl. No.: 14/492,376

(22) Filed: Sep. 22, 2014

(65) Prior Publication Data

US 2016/0064155 A1 Mar. 3, 2016

Related U.S. Application Data

(63) Continuation-in-part of application No. 14/469,004, filed on Aug. 26, 2014.

(51) Int. Cl.
| | |
|---|---|
| *H01M 10/14* | (2006.01) |
| *H01G 11/52* | (2013.01) |
| *H01G 11/84* | (2013.01) |
| *H01G 11/82* | (2013.01) |
| *H01G 11/36* | (2013.01) |
| *H01G 11/56* | (2013.01) |

(52) U.S. Cl.
CPC ............. *H01G 11/52* (2013.01); *H01G 11/82* (2013.01); *H01G 11/84* (2013.01); *H01G 11/36* (2013.01); *H01G 11/56* (2013.01)

(58) Field of Classification Search
CPC .................................. H01M 4/36; H01M 4/64
See application file for complete search history.

(56) References Cited

U.S. PATENT DOCUMENTS

| | | | |
|---|---|---|---|
| 5,079,674 A | 1/1992 | Malaspina | 361/502 |
| 5,439,756 A | 8/1995 | Anani et al. | 429/9 |

(Continued)

FOREIGN PATENT DOCUMENTS

| | | | |
|---|---|---|---|
| CN | 202353290 U | 7/2012 | H02J 7/34 |
| CN | 202957152 U | 5/2013 | H01G 11/08 |

(Continued)

OTHER PUBLICATIONS

El-Kady et al., "Scalable fabrication of high-power graphene microsupercapacitors for flexible and on-chip energy storage," Nature Communications, vol. 4, Article No. 1475, 9 pages, dated Feb. 12, 2013.

(Continued)

*Primary Examiner* — Stewart Fraser
*Assistant Examiner* — Olatunji Godo
(74) *Attorney, Agent, or Firm* — Sunstein Kann Murphy & Timbers LLP

(57) ABSTRACT

A method of producing a super-capacitor provides a first substrate having a first base, forms a first electrode on the first substrate, and forms a separator so that the electrode is between the first base and the first separator. The method also micromachines holes through the separator, forms a chamber, and adds electrolyte, having ions, to the chamber. The electrolyte is in contact with the first electrode within the chamber. In addition, the holes are sized to permit transmission of the ions of the electrolyte through the holes.

20 Claims, 13 Drawing Sheets

(56) References Cited

U.S. PATENT DOCUMENTS

| | | | |
|---|---|---|---|
| 6,117,585 A | 9/2000 | Anani et al. | 429/122 |
| 6,356,432 B1 | 3/2002 | Danel et al. | 361/502 |
| 6,621,687 B2 | 9/2003 | Lewis, Jr. et al. | 361/511 |
| 7,061,749 B2 | 6/2006 | Liu et al. | 361/502 |
| 7,294,209 B2 | 11/2007 | Shakespeare | 118/729 |
| 7,659,014 B2 | 2/2010 | Sohn | 429/7 |
| 7,852,612 B2 | 12/2010 | Zhao | 361/502 |
| 8,503,161 B1 | 8/2013 | Chang et al. | 361/502 |
| 8,697,516 B2 | 4/2014 | Furukawa et al. | 438/240 |
| 8,778,800 B1 | 7/2014 | Chang et al. | 438/685 |
| 9,725,798 | 3/2016 | Momo et al. | H01G 9/0029 |
| 2001/0020319 A1* | 9/2001 | Farahmandi | H01G 9/038 29/25.03 |
| 2003/0035982 A1 | 2/2003 | Ryu et al. | 429/7 |
| 2004/0161640 A1 | 8/2004 | Salot | 429/9 |
| 2004/0185310 A1 | 9/2004 | Jenson et al. | 429/7 |
| 2008/0199737 A1 | 8/2008 | Kazaryan et al. | 429/9 |
| 2010/0195261 A1 | 8/2010 | Sweeney et al. | 361/313 |
| 2010/0328845 A1* | 12/2010 | Hiralal | H01G 11/36 361/502 |
| 2010/0330433 A1* | 12/2010 | Amine | H01M 6/181 429/302 |
| 2011/0019337 A1 | 1/2011 | Chen et al. | 361/500 |
| 2011/0183180 A1* | 7/2011 | Yu | H01G 11/36 429/128 |
| 2012/0026643 A1 | 2/2012 | Yu et al. | 361/502 |
| 2012/0092809 A1 | 4/2012 | Tamachi et al. | 361/502 |
| 2012/0216379 A1 | 8/2012 | Martienssen et al. | 29/25.41 |
| 2013/0182373 A1 | 7/2013 | Yu et al. | 361/502 |
| 2014/0035098 A1 | 2/2014 | Dunn et al. | 257/532 |
| 2014/0321093 A1 | 10/2014 | Pande et al. | 361/807 |
| 2016/0064149 A1 | 3/2016 | Jiang et al. | H01G 9/0029 |
| 2016/0104581 A1* | 4/2016 | Jiang | H01M 10/04 429/7 |
| 2016/0204492 A1 | 7/2016 | Jiang et al. | H01M 16/00 |

FOREIGN PATENT DOCUMENTS

| | | | |
|---|---|---|---|
| CN | 103219162 A | 7/2013 | H01G 11/36 |
| JP | 2010-161097 A | 7/2010 | H01G 9/155 |
| JP | 2012-033899 A | 2/2012 | H01G 11/06 |
| KR | 10-1057410 B1 | 8/2011 | H01G 9/058 |
| KR | 10-1222873 B1 | 1/2013 | H01G 2/06 |
| WO | WO 2013/070989 A1 | 5/2013 | H01G 11/30 |

OTHER PUBLICATIONS

Wu et al., "Graphene-based in-plane micro-supercapacitors with high power and energy densities," Nature Communications, vol. 4, Article No. 2487, 8 pages, dated Sep. 17, 2013.

Pech et al., "Research Topics—ISGE," Laboratory for Analysis and Architecture of Systems, https://www.laas.fr/public/en/research-topics-isge, 5 pages, 2014.

Israel Patent Office Authorized Officer: Orgad, Yaniv, Notification of Transmittal of the International Search Report and the Written Opinion of the International Searching Authority, or the Declaration; PCT/US2015/060530, 10 pages, dated Feb. 25, 2016.

* cited by examiner

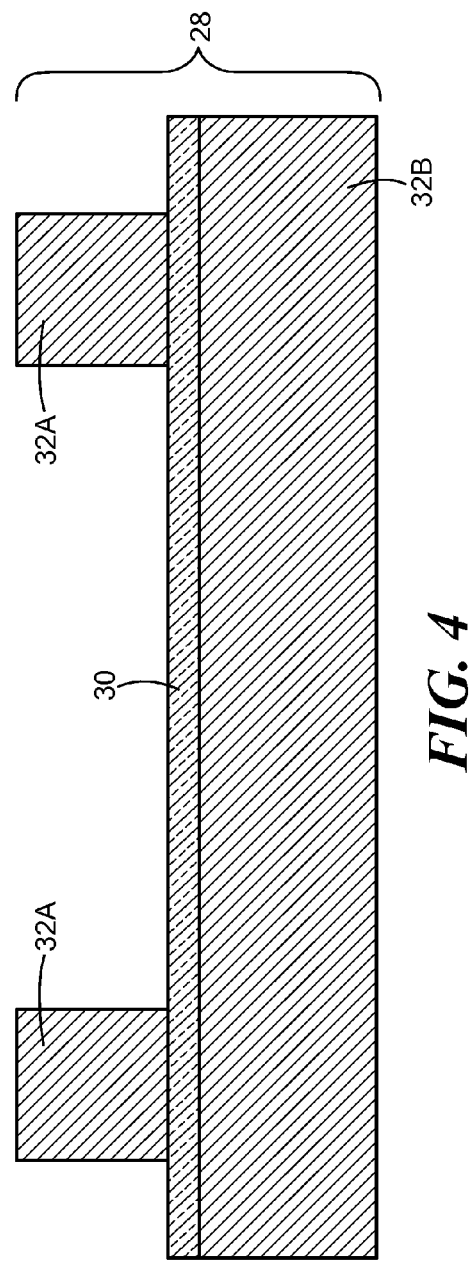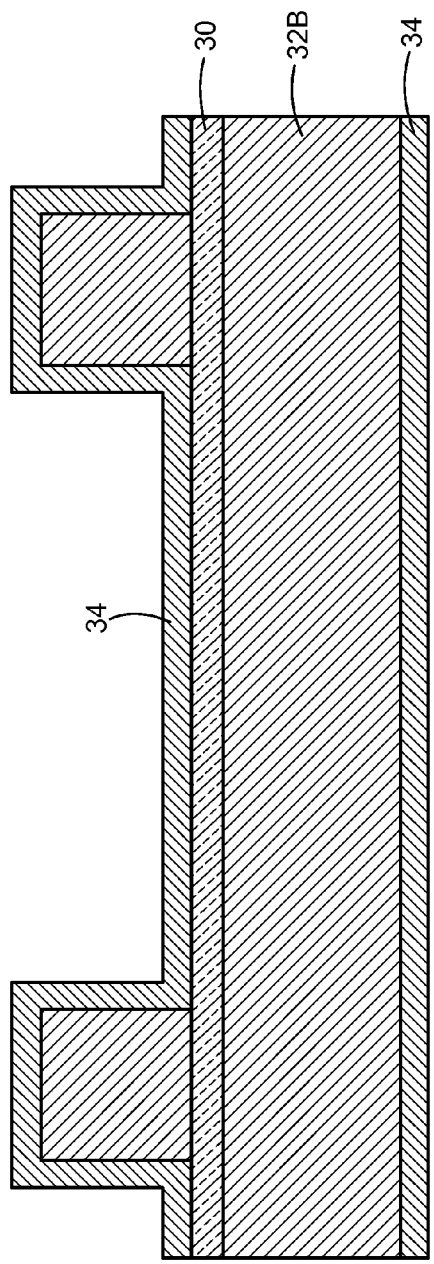

SUPER-CAPACITOR WITH SEPARATOR AND METHOD OF PRODUCING THE SAME

PRIORITY

This patent application claims is a continuation in part of U.S. patent application Ser. No. 14/469,004, filed Aug. 26, 2014, entitled, "METHOD OF PRODUCING A SUPER-CAPACITOR," and naming Yingqi Jiang and Kuang L. Yang as inventors, the disclosure of which is incorporated herein, in its entirety, by reference.

REFERENCE TO RELATED PATENT APPLICATIONS

This patent application is related to the following patent applications, each of which is incorporated herein, in its entirety, by reference:
  U.S. patent application Ser. No. 14/593,230, filed Jan. 9, 2015, entitled, "INTEGRATED CIRCUIT WITH SHARED ELECTRODE ENERGY STORAGE DEVICES," and naming Yingqi Jiang and Kuang L. Yang as inventors,
  U.S. patent application Ser. No. 14/509,950, filed Oct. 8, 2014, entitled, "INTEGRATED SUPER-CAPACITOR," and naming Yingqi Jiang and Kuang L. Yang as inventors,

FIELD OF THE INVENTION

The invention generally relates to super-capacitors and, more particularly, the invention relates to stacked super-capacitors and methods of forming stacked super-capacitors

BACKGROUND OF THE INVENTION

Although the size of portable electronic devices continues to shrink, their energy requirements often do not comparably decrease. For example, a next-generation MEMS accelerometer may have a volume that is 10 percent smaller and yet, require are only 5 percent less power than the prior generation MEMS accelerometer. In that case, more of the MEMS die may be used for energy storage. Undesirably, this trend can limit miniaturization and applicability of such electronic devices.

The art has responded to this problem by developing chip-level super-capacitors (also known as "micro super-capacitors"), which have much greater capacitances than conventional capacitors. Specifically, when compared to conventional capacitors and batteries, super-capacitors generally have higher power densities, shorter charging and discharging times, longer life cycles, and faster switching capabilities.

Super-capacitors sometimes have two closely spaced electrodes that can short circuit if contact is made. Although the prior art positions an insulative separator between the electrodes to avoid this problem, many such separators cause other problems.

SUMMARY OF VARIOUS EMBODIMENTS

In accordance with one embodiment of the invention, a method of producing a super-capacitor provides a first substrate having a first base, forms a first electrode on the first substrate, and forms a separator so that the electrode is between the first base and the first separator. The method also micromachines holes through the separator, forms a chamber, and adds electrolyte, having ions, to the chamber. The electrolyte is in contact with the first electrode within the chamber. In addition, the holes are sized to permit transmission of the ions of the electrolyte through the holes.

Although the holes permit ion transmission, the separator may be formed from a material that is substantially impermeable to the ions of the electrolyte. For example, each hole in a set of the holes of the separator may have largest dimension (e.g., corner-to-corner or a diameter) of between about 2 nanometers and 5 microns. As another example, the separator may include nitride or parylene, and the first base may include low resistivity silicon (e.g., doped silicon). The method also may form a current collector on the first substrate. Such a current collector may be positioned between the first base and the first electrode, and be in electrical contact with the first electrode.

Some embodiments also provide a second substrate supporting a second electrode, and wafer bond the first substrate to the second substrate. Insulating material at the bonding area between the two substrates can be provided to prevent electrical short circuits between the two substrates after bonding. As a result of this bonding, 1) the separator electrically prevents electrical contact between the first electrode and the second electrode, and 2) the bonded first and second wafers form the noted chamber. A micromachining process preferably forms the first electrode and separator.

In accordance with another embodiment, a super-capacitor has a first substrate and a second substrate, a first electrode supported by the first substrate, and a second electrode supported by the second substrate. The first substrate is wafer bonded to the second substrate to form a chamber. The super-capacitor also has a first separator between the first electrode and the second electrode within the chamber, and electrolyte, having ions, within the chamber. The separator has a plurality of micromachined holes sized to permit the ions of the electrolyte to pass through the holes. In addition, the electrolyte is in contact with the first and second electrodes.

In accordance with other embodiments, a method of producing a super-capacitor forms 1) a first electrode on a first substrate, 2) a separator on the first substrate, 3) holes through the separator, and 4) a second electrode on a second substrate. The method also wafer bonds the first substrate to the second substrate to form a chamber so that the separator is between the first electrode and the second electrode. In addition, the method adds electrolyte, having ions, to the chamber so that the electrolyte is in contact with the first electrode and the second electrode. The holes through the separator are sized to permit the ions of the electrolyte to pass through the holes.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

FIG. 4 schematically shows a cross-sectional view of the super-capacitor of FIG. 1 at step 300 of the process of FIG. 3.

FIG. 5 schematically shows a cross-sectional view of the super-capacitor of FIG. 1 at step 302 of the process of FIG. 3.

DESCRIPTION OF ILLUSTRATIVE EMBODIMENTS

Illustrative embodiments use micromachining processes to form robust and reliable super-capacitors. To that end, such embodiments form super-capacitors having two out-of-plane electrodes that, within a chamber filled with an electrolyte, are electrically and physically isolated from each other by a rigid and robust separator. While the separator may be made from a material that does not permit transmission of the electrolyte ions therethrough (e.g., nitride), it has a plurality of micromachined holes with the geometries to permit ion transmission. Accordingly, ions are free to pass through the holes of the separator, permitting relatively free ion movement within the chamber. Details of illustrative embodiments are discussed below.

Figure 1:
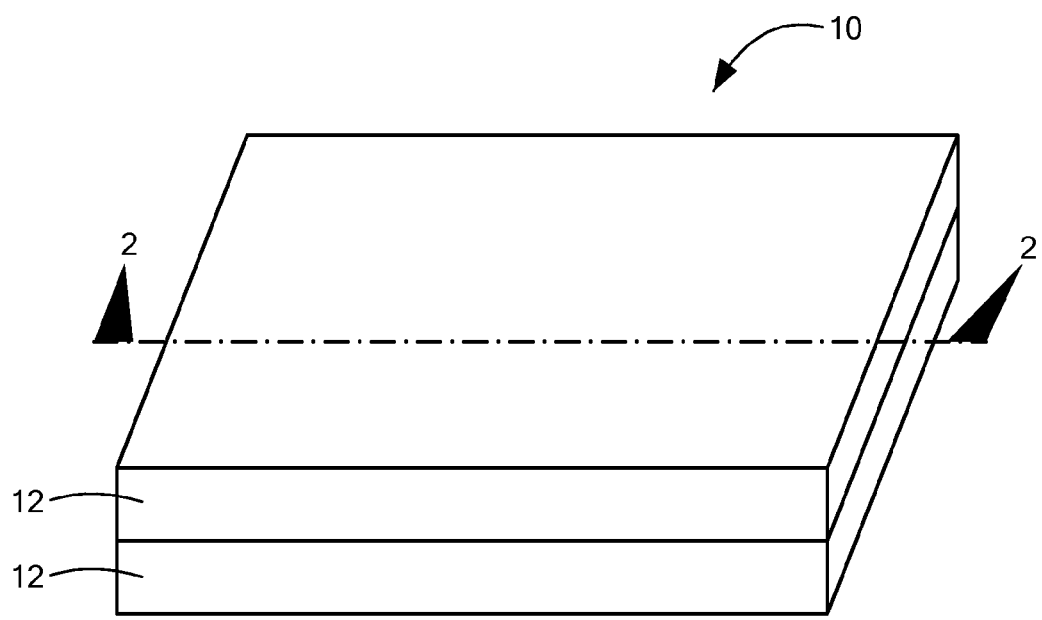
FIG. 1 schematically shows a super-capacitor that may be configured and formed in accordance with illustrative embodiments of the invention.
Figure 2:
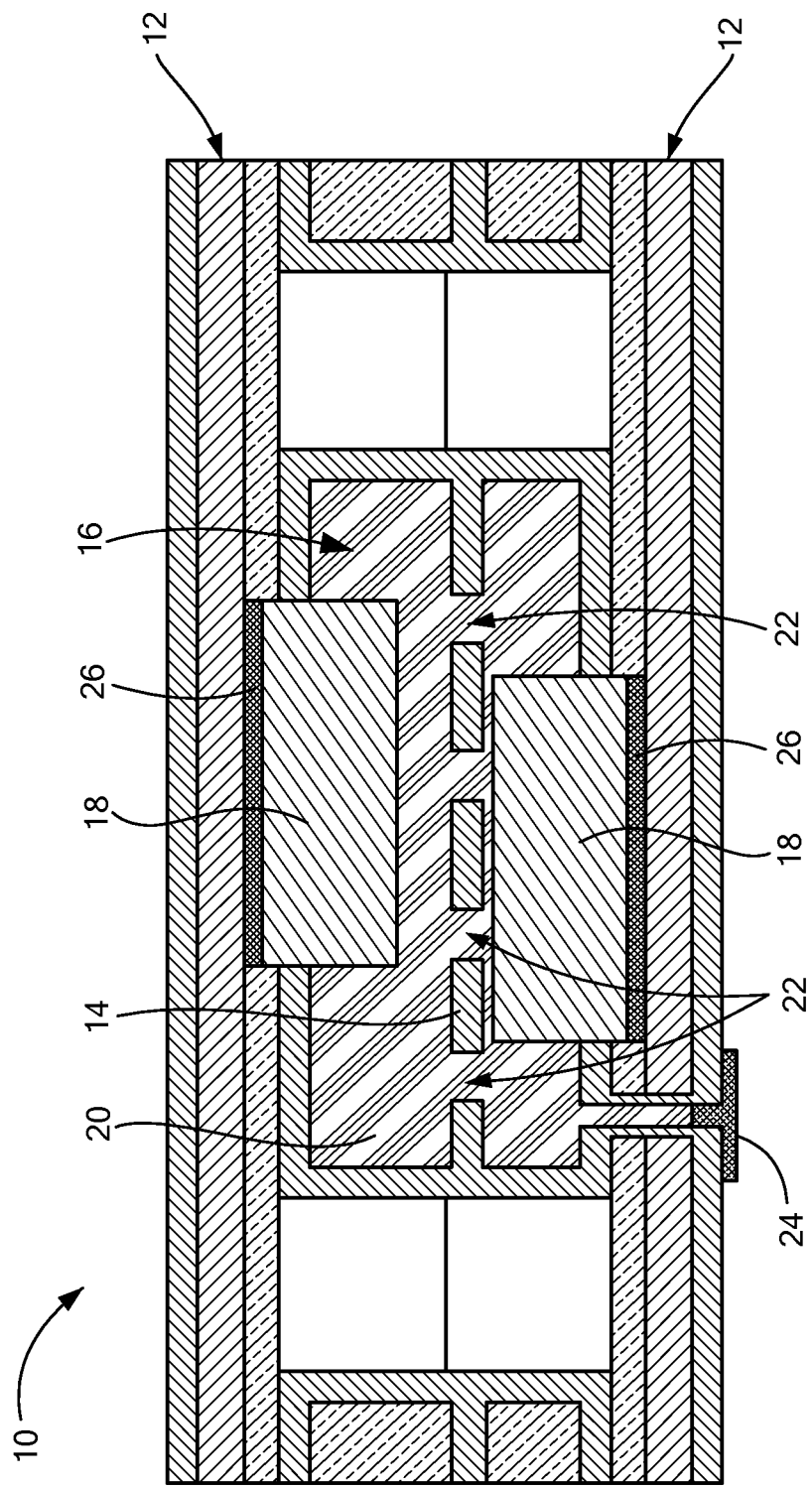
FIG. 2 schematically shows a cross-sectional view of the super-capacitor of FIG. 1 across line 2-2.

FIG. 1 schematically shows a perspective view of a micro super-capacitor (hereinafter "super-capacitor 10") configured in accordance with illustrative embodiments of the invention. FIG. 2 schematically shows a cross-sectional view of the super-capacitor 10 along line 2-2 of FIG. 1. Specifically, the super-capacitor 10 is a unitary chip-level device having a pair of multilayer substrates 12 bonded together to form an interior chamber 16. Among other things, the interior chamber 16 contains a pair of stacked electrodes 18 (i.e., out of plane electrodes 18 relative to the substrate 12), and electrolyte material 20 (also referred to as "electrolyte 20") that together form a capacitance. In other words, the electrodes 18 and electrolyte material 20 cooperate to have the capacity to store a prescribed electrical charge.

To prevent electrical contact between the electrodes 18, the chamber 16 also contains a unitary separator 14 that physically separates the two electrodes 18. Among other functions, the separator 14 substantially prevents the electrodes 18 from making electrical contact. As discussed below, the separator 14 preferably is formed from a material that is commonly used in micromachining, such as nitride, parylene, or an oxide. As such, the separator material is generally impermeable by the ions of the electrolyte material 20. Such a design thus would be ineffective if solid.

The inventors recognized that a robust separator material is more desirable than prior art separator material (e.g., polymers), but, unlike prior art separators, such materials are generally impermeable to ions. This limitation makes more desirable material impractical. Accordingly, the inventors realized that the separator 14 should have some means to permit ion transmission and, consequently, formed holes 22 through the separator 14. The holes 22 preferably are sized to have an inner dimension/geometry that permits transmission of the ions within the electrolyte material 20. For example, the holes 22 can be 1-5 microns wide, or even as small as 2 nanometers. Those skilled in the art can select the size of the holes 22 based on the electrolyte material 20 being used. Ions within the electrolyte material 20 thus can pass freely through the holes 22 in the separator 14 to optimize storage capability of the super-capacitor 10.

The electrodes 18 may be formed from conventional materials known in the art—preferably a porous solid material. For example, as discussed in greater detail below, the electrodes 18 may be formed from graphene, which is known to be a porous material with tortuous interior and exterior surfaces. Virtually every surface of the electrode 18 exposed to the electrolyte 20 therefore may be considered part of the surface area the capacitor plates represented in the well-known equation:

$$C = \epsilon * (A/D) \qquad \text{(Equation 1)},$$

where:
C is capacitance,
$\epsilon$ is a constant,
A is the area, and
D is distance.

Indeed, those skilled in the art can use other materials to form the electrode 18, such as activated carbon, carbon aerogel, or carbon nanotubes, to name but a few. Accordingly, discussion of graphene is by example only and not intended to limit various other embodiments of the invention.

In a similar manner, the electrolyte 20 can be formed from any of a wide variety of other corresponding materials. For example, electrolyte 20 can be formed from an aqueous salt, such as sodium chloride, or a gel, such as a polyvinyl alcohol polymer soaked in a salt. Some embodiments may use an ionic liquid, in which ions are in the liquid state at room temperature. Although not necessarily aqueous, such electrolytes 20 are known to be extremely conductive due to the relatively free movement of their ions. The inventors believe that such an electrolyte 20 should produce a super-capacitor 10 with a relatively high energy storage capacity because, as known by those skilled in the art, the energy storage of the capacitor is a function of the square of the voltage.

As noted, the electrolyte 20 preferably is generally integrated with both the internal and external surfaces of the electrodes 18. Among other things, the internal surfaces may be formed by tortuous internal channels and pores within the electrodes 18. The external surfaces simply may be those surfaces visible from the electrode exteriors. The electrolyte 20 and noted electrode surfaces thus are considered to form an interface that stores energy.

Depending upon the electrode material, electrons can flow somewhat freely within the electrodes 18. For example, electrons can flow within graphene. The electrolyte 20, however, acts as an insulator and thus, does not conduct the electrons from the electrodes 18. In a corresponding manner, the ions in the electrolyte 20 can migrate somewhat freely up to the interfaces with the electrodes 18. Like electrons in the electrodes 18, ions in the electrolyte 20 do not migrate through that interface.

When subjected to an electric field, ions within the electrolyte 20 migrate to align with the electric field. This causes electrons and holes in the electrodes 18 to migrate in a corresponding manner, effectively storing charge. For example, in a prescribed electric field, positive ions in the electrolyte 20 may migrate toward a first electrode surface (e.g., on the top electrode 18), and the negative ions in the electrolyte 20 may migrate toward a second electrode surface (e.g., on the bottom electrode 18). In that case, the positive ions near the first electrode surface attract electrons (in the electrode 18) toward that interface, while the negative ions near the second electrode surface attract holes 22 (in the electrode 18) for that interface. The distance of the ions to the interface plus the distance of the electrons, or holes 22, to the same interface (on the opposite side of the interface) represent distance "d" of Equation 1 above.

Although useful as an electrode material, graphene still does not have optimal conductivity properties. Accordingly, illustrative embodiments also form a current collector 26 on or as part of the substrate 12 to provide exterior access to the electrodes 18. Among other things, the current collector 26 may be formed from a highly conductive metal, such as gold, or a highly doped semiconductor, such as polysilicon. Those skilled in the art can select other materials for this purpose.

The super-capacitor 10 has a number of additional features less relevant to this discussion, but worth of mention. For example, it has positive and negative contacts (not shown, but respectively formed in part by the base layers of the substrate 12), and a plug 24 for hermetically sealing the electrolyte 20 in the chamber 16. Moreover, the super-capacitor 10 also may have an exterior package, which is not shown in the figures, or may be considered to form a wafer-level package as shown in FIGS. 1 and 2.

Figure 3:
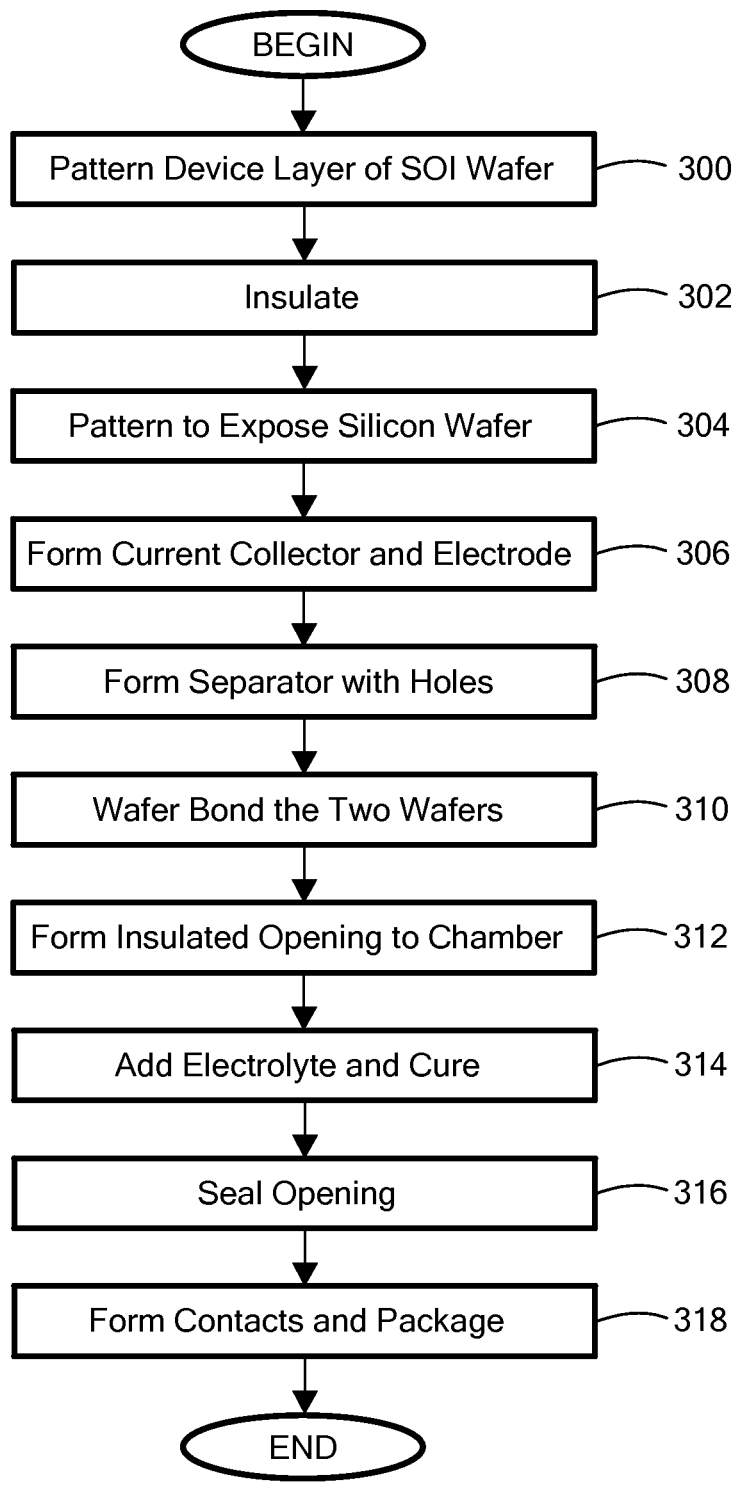
FIG. 3 shows a process of forming the super-capacitor of FIG. 1 in accordance with illustrative embodiments of the invention.

FIG. 3 shows a process of fabricating the super-capacitor 10 of FIGS. 1 and 2 in accordance with illustrative embodiments of the invention—using micromachining processes. It should be noted that this process is substantially simplified from a longer process that normally would be used to form the super-capacitor 10. Accordingly, the process of forming the super-capacitor 10 has many steps, such as testing steps or additional passivation steps, which those skilled in the art likely would use. In addition, some of the steps may be performed in a different order than that shown, or at the same time. Those skilled in the art therefore can modify the process as appropriate. Moreover, many of the materials and structures noted (e.g., silicon nitride) are but one of a wide variety of different materials and structures that may be used. Those skilled in the art can select the appropriate materials and structures depending upon the application and other constraints. Accordingly, discussion of specific materials and structures is not intended to limit all embodiments.

It also should be noted that the process of FIG. 3 is a bulk micromachining process, which forms a plurality of super-capacitors 10 on the same wafer/base at the same time. Although much less efficient, those skilled in the art can apply these principles to a process that forms only one super-capacitor 10.

The process begins at step 300, which patterns the device layer of a silicon-on-insulator wafer (also known as an "SOI wafer 28"). Specifically, as known by those skilled in the art, an SOI wafer 28 is a three layer wafer structure having an oxide layer 30 (e.g., silicon dioxide) between two silicon wafers 32A and 32B. From the perspective of the drawings, the top silicon wafer 32A is often referred to as the "device wafer 32A," while the bottom silicon wafer 32B is often referred to as the "handle wafer 32B." Accordingly, as shown in FIG. 4, the process patterns the device layer of the SOI wafer 28 by forming a conventional etch mask and etching through the openings of the mask. Among other things, the process can perform a dry etch using silicon difluoride ($XeF_2$). This patterned region within the device layer ultimately will form the interior chamber 16 containing the electrodes 18 and electrolyte 20.

Figure 6:
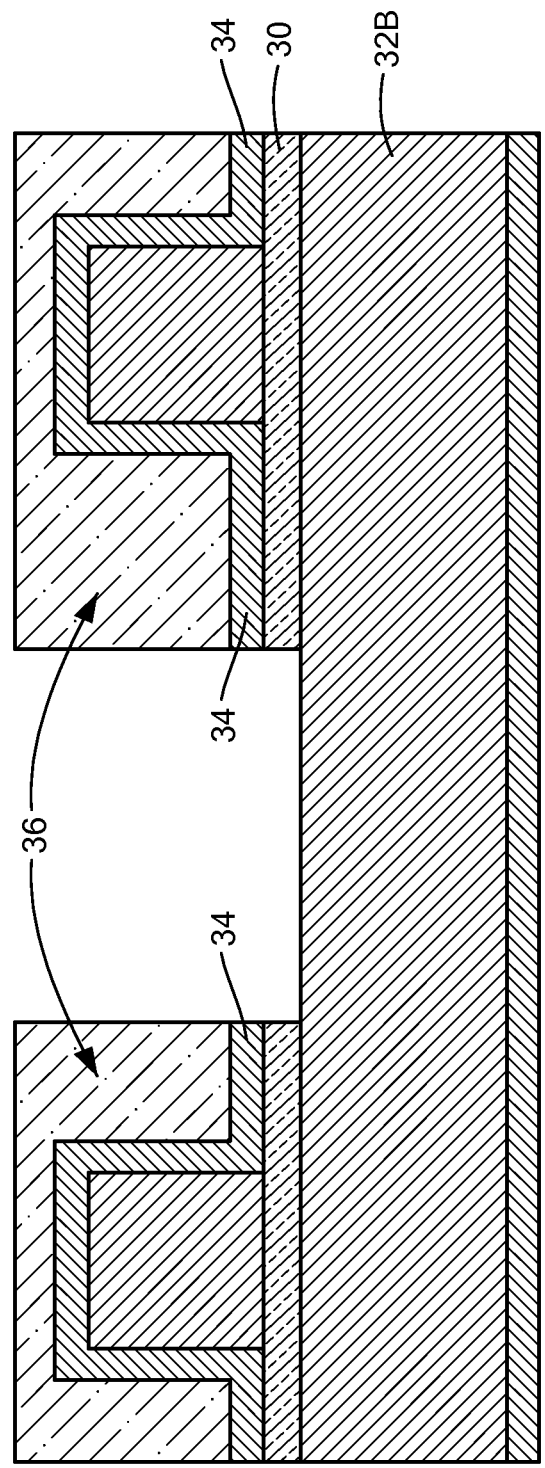
FIG. 6 schematically shows a cross-sectional view of the super-capacitor of FIG. 1 at step 304 of the process of FIG. 3.

Next, step 302 insulates the device wafer 32A insulates the device wafer 32A. As shown in FIG. 5, some of this insulator contacts the oxide layer 30 of the SOI wafer 28. For example, this step may coat the wafer with silicon nitride 34 ($Si_3N_4$), which defines an electrode window, together with the photoresist layer 36 to be used in subsequent step 304. In particular, as shown in FIG. 6, step 304 deposits a thick photoresist layer 36 over the wafer, and then patterns the photoresist layer 36 to remove a prescribed portion of the silicon nitride 34, and some of oxide layer 30 of the SOI wafer 28. Accordingly, this step forms a recess for forming the current collector 26 and the electrode 18.

Figure 7:
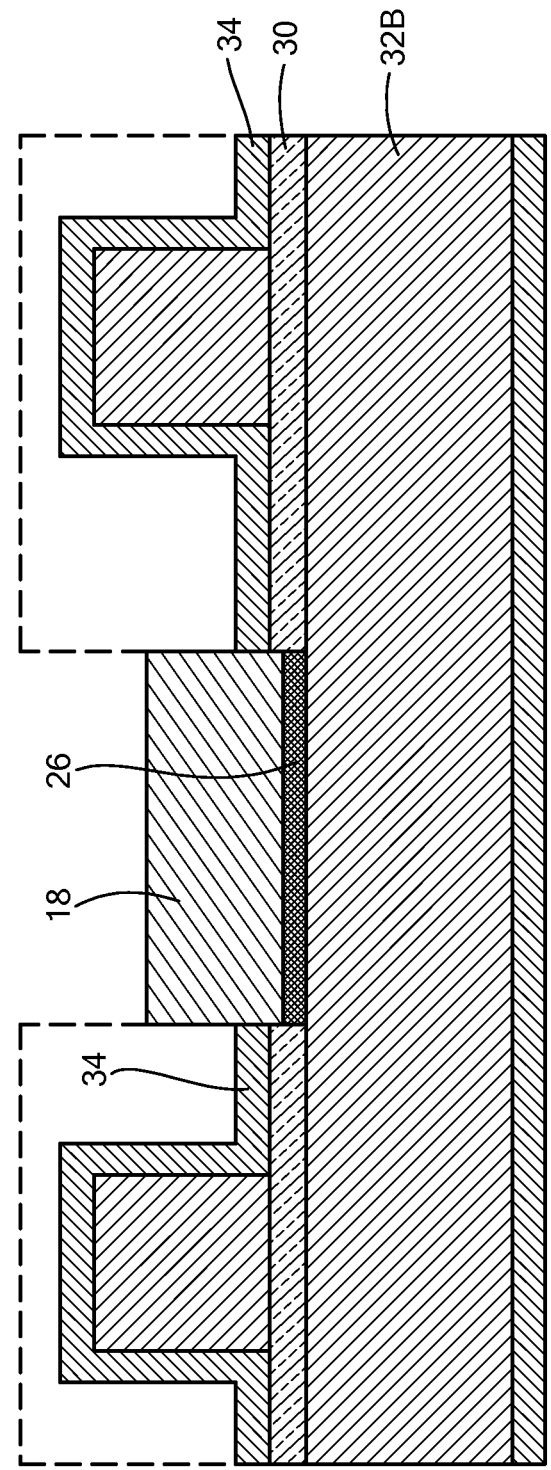
FIG. 7 schematically shows a cross-sectional view of the super-capacitor of FIG. 1 at step 306 of the process of FIG. 3.

To that end, step 306 first deposits metal to form a current collector layer, which will form the current collector 26. After the deposited metal cools, the process adds graphene, which forms the electrode 18 supported on the substrate 12. In illustrative embodiments, the graphene is in the form of a plurality of stacked graphene monolayers. This step concludes by removing the thick photoresist layer 36 deposited at step 304. FIG. 7 schematically shows a cross-sectional view of the wafer/structure (also a "preliminary apparatus") at the stage of the process. The dashed lines show where the photoresist layer 36 was positioned before it was removed.

Figure 8:
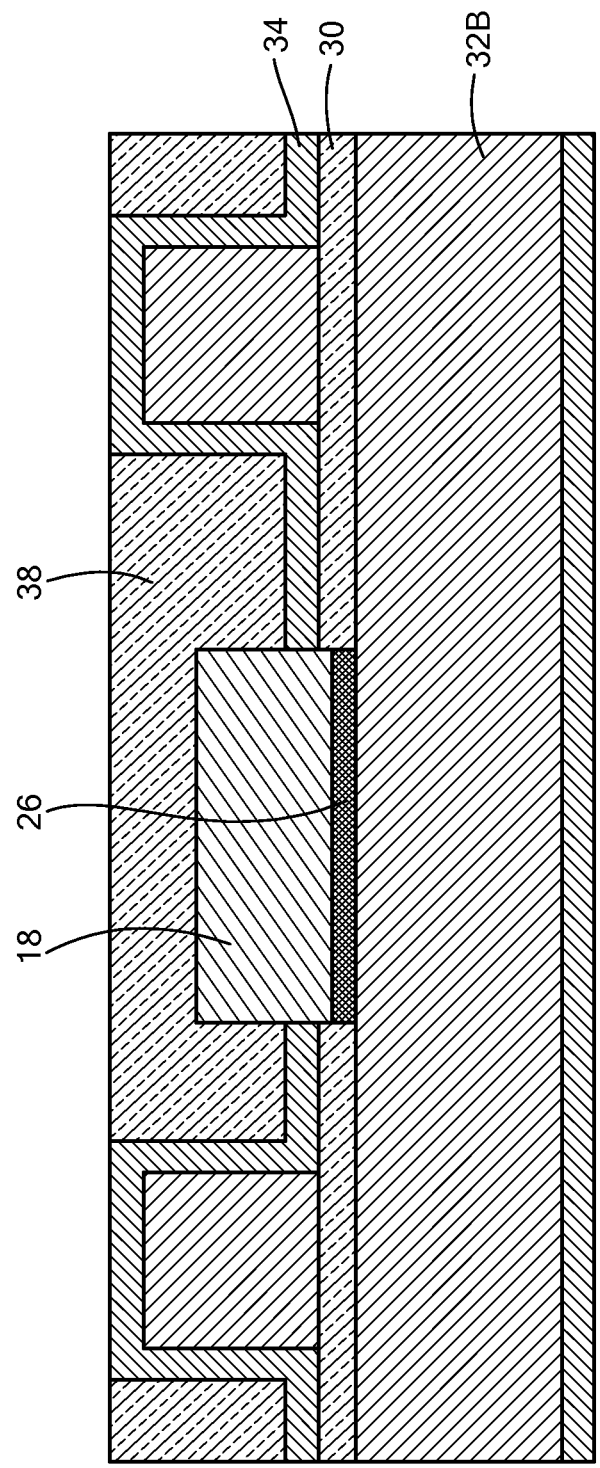
FIG. 8 schematically shows a cross-sectional view of the super-capacitor of FIG. 1 as the process of FIG. 3 approaches step 308.

After forming the electrode 18, the process continues to step 308, which 1) forms the separator 14, and 2) micromachines holes 22 through the separator 14. More specifically, as shown in FIG. 8, the process forms a sacrificial layer 38 within the partial chamber formed by the previous steps. The sacrificial layer 38, which can be made from any conventional material, such as silicon dioxide, completely covers the electrode 18. Next, this step may apply chemical-mechanical planarization process, a common wafer grinding process, to expose the uppermost portions of the silicon nitride 34 as shown in FIG. 8.

This step then etches some of the sacrificial layer 38 (in this case, the silicon dioxide), using a conventional etchant, such as hydrofluoric acid. This part of step 308 maintains enough sacrificial material to still encapsulate the electrode 18. The remaining sacrificial material 38 thus forms a support to receive the separator material, which, in this embodiment, at least in part is formed from silicon nitride. As noted above, this separator material (e.g., silicon nitride in this case) is substantially impermeable to ions within the electrolyte 20 to be added at a later step. Finally, step 308 micromachines a plurality of holes 22 through the silicon nitride to produce the separator 14 shown in FIG. 9 (This figure also has a thinned substrate 12, which is for drawing purposes only. A thinner substrate 12 is not essential at this step). Accordingly, as noted above, the separator holes 22 are configured to have a size/dimension and geometry that permits ions of the added electrolyte 20 to pass through the separator 14. In the absence of the holes 22 or some other means, ions could not pass through the separator 14.

As noted, this process preferably is performed substantially simultaneously with a plurality of other similar structures. Alternatively, this process may be performed serially. In fact, some of these structures do not have a separator 14. In any case, step 300 to 308 form a plurality of structures (some with separators 14, and some without separators 14) that subsequently are used in the remaining steps of the process.

Figure 9:
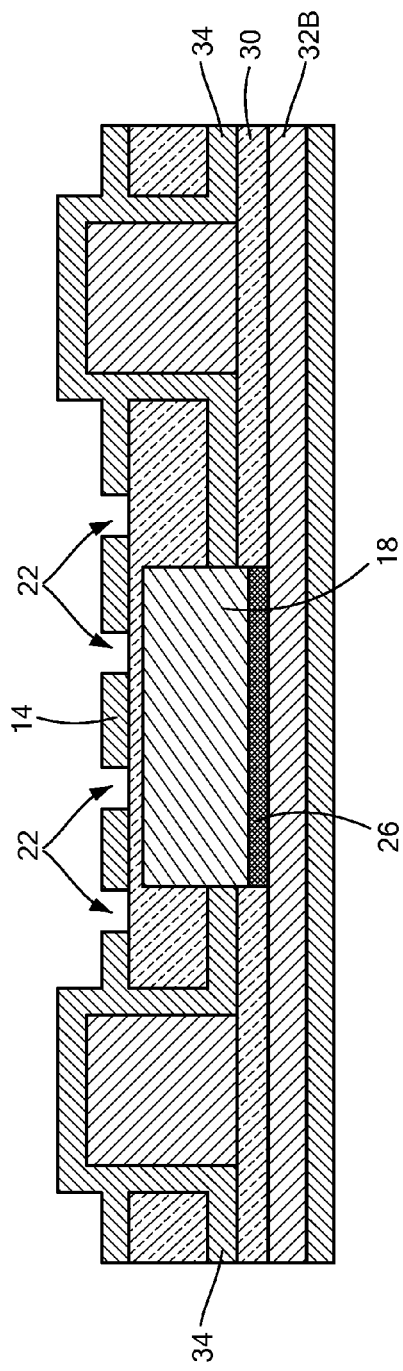
FIG. 9 schematically shows a cross-sectional view of the super-capacitor of FIG. 1 at step 308 of the process of FIG. 3.
Figure 10:
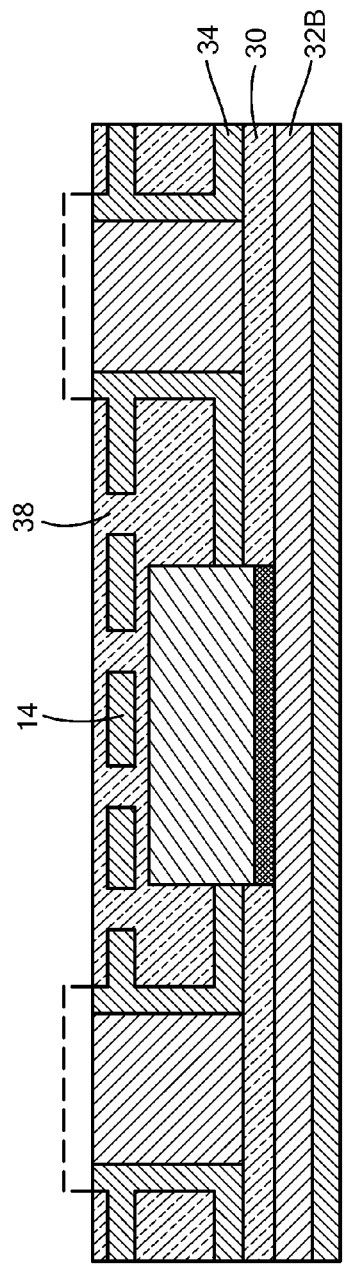
FIG. 10 schematically shows a cross-sectional view of the super-capacitor of FIG. 1 as the process approaches step 310 of the process of FIG. 3.
Figure 11:
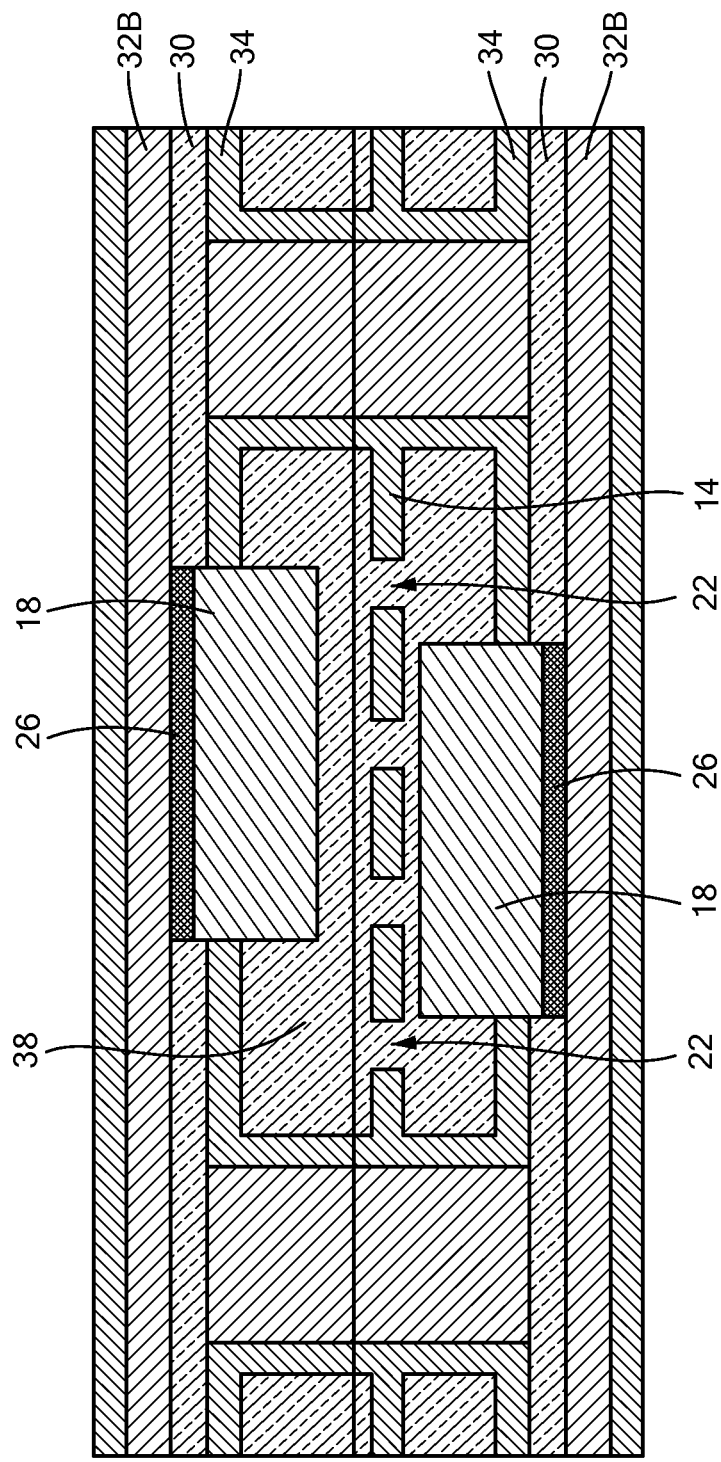
FIG. 11 schematically shows a cross-sectional view of the super-capacitor of FIG. 1 at step 310 of the process of FIG. 3.

The process thus continues to step 310, which bonds together two of the wafers shown in FIG. 9 to form the structure of FIG. 11. In this embodiment, only one of the structures to be boned has the separator 14, while the other does not have the separator 14. To that end, the process first covers the silicon nitride separator 14 (of the wafer/structure with a separator 14) with additional silicon dioxide, and then uses chemical mechanical planarization processes to remove the top portion of the silicon nitride, consequently exposing the silicon of the device wafer 32A. This part of step 310 is graphically detailed at FIG. 10. A similar process is used to prepare the structures having no separator 14. After step 310 prepares both wafers, it then uses conventional wafer bonding techniques to bond the two wafers together. This wafer bonding forms the interior chamber 16

Figure 12:
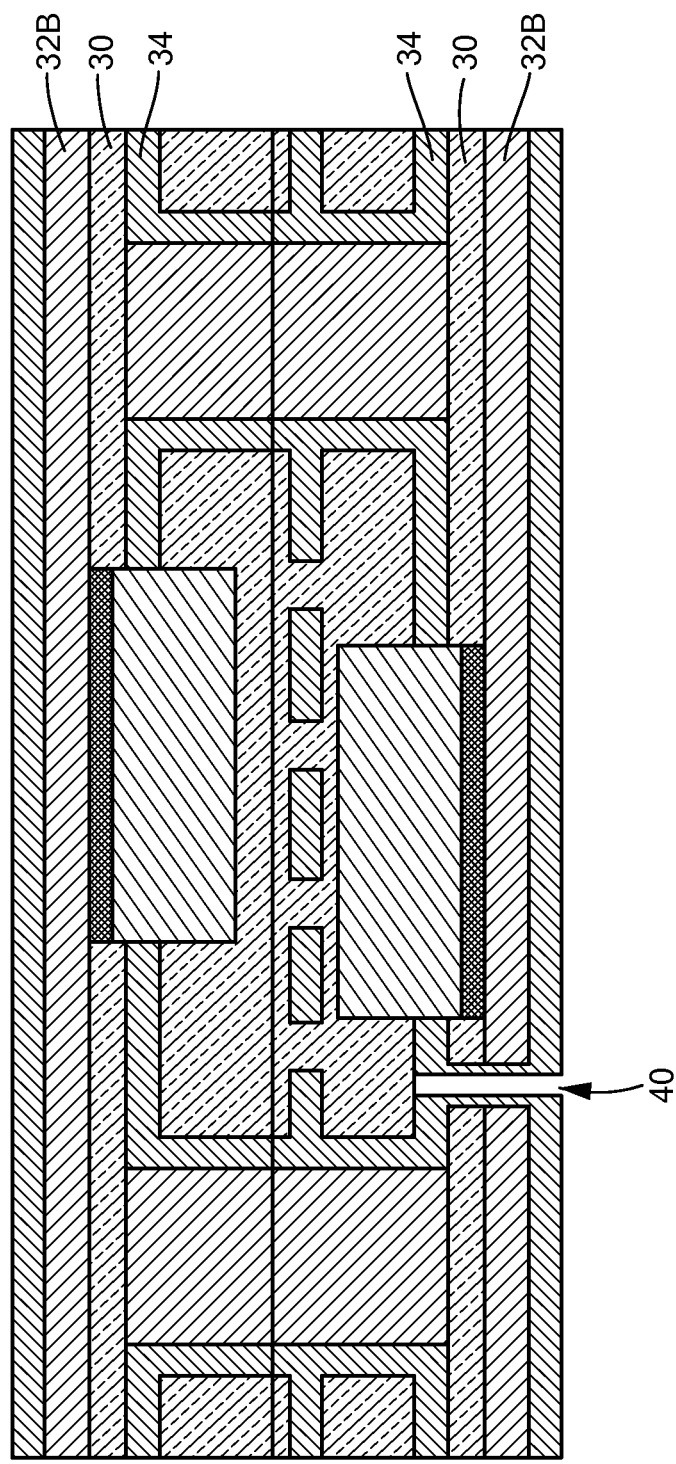
FIG. 12 schematically shows a cross-sectional view of the super-capacitor of FIG. 1 at step 312 of the process of FIG. 3.

At this point in the process, much of the sacrificial material must be removed to make room for the electrolyte 20 to be added to the interior chamber 16. To that end, the process continues to step 312, which forms an insulated opening 40 to the chamber 16. Specifically, as shown in FIG. 12, micromachining processes etch an opening 40 through the bottom wafer/structure (which is now thinner) and subsequent more-interior layers until the opening 40 reaches the sacrificial oxide in the interior chamber 16. To protect the oxide layer 30, the process then deposits silicon nitride on the side walls of the opening 40, thus forming the noted insulated opening 40. FIG. 12 shows the structure at this point the process.

Figure 13:
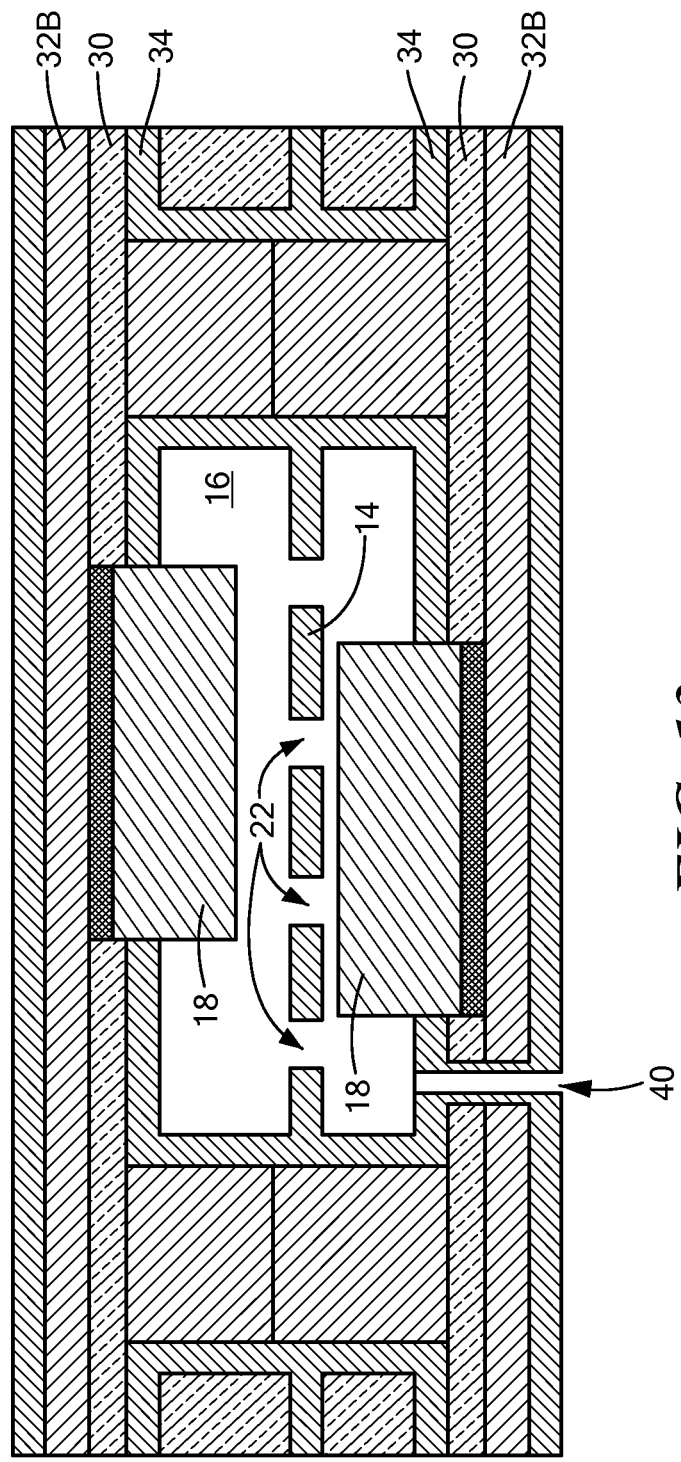
FIG. 13 schematically shows a cross-sectional view of the super-capacitor of FIG. 1 as the process approaches step 314 of the process of FIG. 3.

The insulated opening 40 forms a channel for removing the sacrificial oxide within the interior chamber 16, and then adding electrolyte 20 in its place. Accordingly, step 314 first removes the sacrificial oxide within the chamber 16 by conventional means, such as through a vapor or liquid acid etch (e.g., using hydrofluoric acid), to form the structure shown in FIG. 13. Next, step 314 adds electrolyte 20 to the interior chamber 16.

This interior chamber 16 filled with a liquid electrolyte 20 then is given time to cure, depending on the type of electrolyte. Positive or negative pressure may be applied to better integrate the electrolyte 20 with the electrodes 18. Step 316 then seals the opening 40 with an appropriate material to hermetically seal the interior chamber 16. The plug 24 is but one example of such a seal. FIG. 2 shows the wafer/structure at this stage of the process. Embodiments that do not use a solid or cured electrolyte 20 (i.e., a liquid electrolyte 20) preferably use an appropriate sealing material that, in the long term, prevents liquid from escaping the interior chamber 16. The process concludes at step 318, which forms contacts (not shown) on the two substrates 12, dices the wafer(s), and then packages the dice as required by the application.

Figure 14:
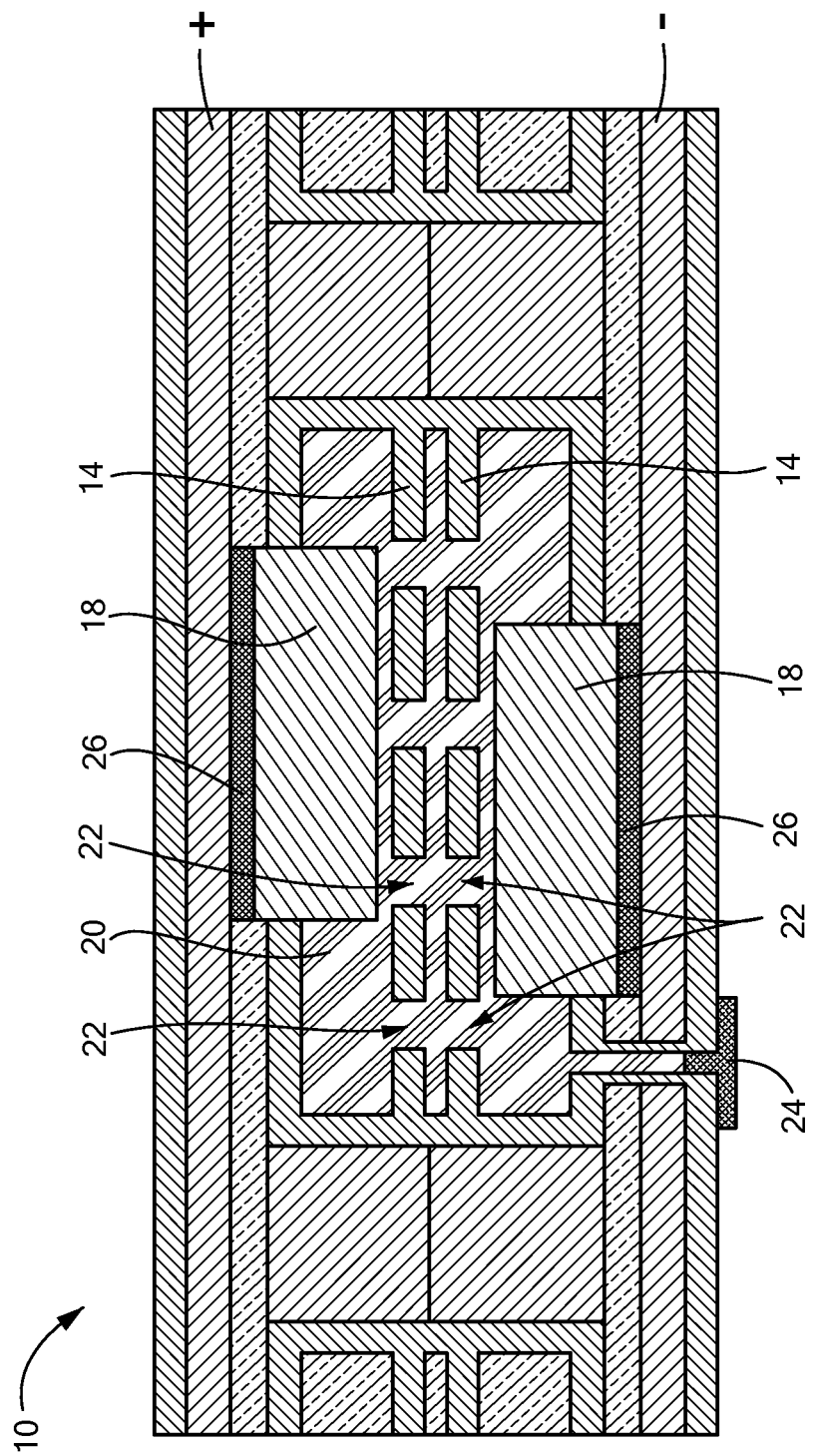
FIG. 14 schematically shows a cross-sectional view of a super-capacitor of FIG. 1 at step 314, 316, and 318 of the process of FIG. 3, but with two separators.

As noted above, step 310 may bond together two identical wafers/structures that both have separators 14. In that case, the final device may look more like the die/structure of FIG. 14, which has a double-separator design. Such a design should improve reliability and safety.

Figure 15:
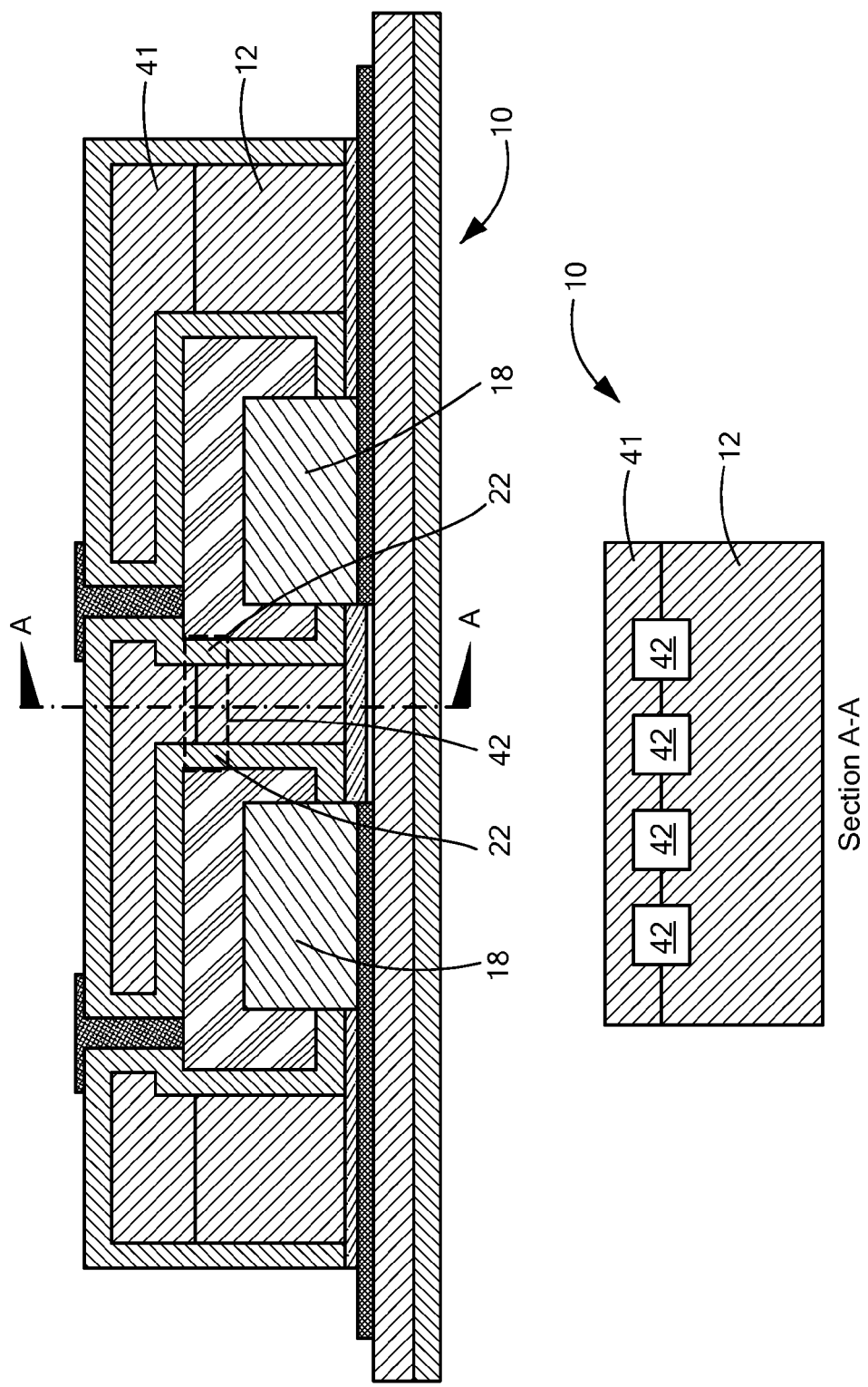
FIG. 15 schematically shows another embodiment of the invention.

Some embodiments also may apply to a super-capacitor 10 having side-by-side/coplanar electrodes 18, such as that shown in FIG. 15. In this case, a single substrate 12 may support electrodes 18 within separate but connected interior chambers 16 formed by a cap wafer 41 (e.g., a silicon wafer). Specifically, the chambers have separators 14 (e.g., formed from nitride) with pre-formed holes 22 that communicate with through-holes 42 extending through the substrate 12 and cap wafer 41. FIG. 15 also shows through-holes 42 across cross-section A-A. Various embodiments have electrolyte 20 extending through the separator holes 22 and through-holes 42.

Accordingly, illustrative embodiments form robust and reliable super-capacitors 10 using a separator 14 formed from strong materials not previously used in super-capacitor art (to the knowledge of the inventors). Such materials now are available because the affirmatively formed holes 22 through the separator 14 permit the ions to traverse the entire interior chamber region containing the electrolyte 20.

Although the above discussion discloses various exemplary embodiments of the invention, it should be apparent that those skilled in the art can make various modifications that will achieve some of the advantages of the invention without departing from the true scope of the invention.

What is claimed is:

1. A super-capacitor comprising:
    a first substrate and a second substrate;
    a first electrode supported by the first substrate;
    a second electrode supported by the second substrate;
    the first substrate bonded to the second substrate to form an interior chamber;
    a first separator between the first electrode and the second electrode within the interior chamber, the first separator having a plurality of micromachined etch holes;
    electrolyte, having ions, within the interior chamber and in contact with the first and second electrodes, the first separator micromachined etch holes being sized to permit the ions to pass through the micromachined etch holes.

2. The super-capacitor as defined by claim 1 wherein each of the first and second electrodes comprises a porous solid material.

3. The super-capacitor as defined by claim 2 wherein each of the first and second electrodes comprises a plurality of graphene monolayers.

4. The super-capacitor as defined by claim 1 further comprising a second separator between the first separator and the second electrode.

5. The super-capacitor as defined by claim 1 wherein the electrolyte comprises a cured gel electrolyte.

6. The super-capacitor as defined by claim 1 wherein the first separator comprises nitride or parylene.

7. The super-capacitor as defined by claim 1 wherein the first separator is formed from a material that is substantially ion impermeable to the ions within the electrolyte.

8. A super-capacitor comprising:
    a first substrate and a second substrate that together form at least a portion of a die;
    a first electrode and a second electrode, the first and second electrodes being spaced apart and being between the first and second substrates,
    the die forming an interior chamber;
    a separator between the first electrode and the second electrode within the interior chamber, the separator having a plurality of micromachined etch holes;

electrolyte, having ions, within the interior chamber and in contact with the first and second electrodes, the separator micromachined etch holes being sized to permit the ions to pass through the micromachined etch holes.

9. The super-capacitor as defined by claim 8 wherein each of the first and second electrodes comprises a porous solid material.

10. The super-capacitor as defined by claim 9 wherein each of the first and second electrodes comprises a plurality of graphene monolayers.

11. The super-capacitor as defined by claim 8 wherein the separator comprises a first separator and a second separator between the first and second electrodes.

12. The super-capacitor as defined by claim 8 wherein the electrolyte comprises a cured gel electrolyte.

13. The super-capacitor as defined by claim 8 wherein the separator comprises nitride or parylene.

14. The super-capacitor as defined by claim 8 wherein the separator is formed from a material that is substantially ion impermeable to the ions within the electrolyte.

15. A super-capacitor comprising:
a first substrate and a second substrate;
a first electrode and a second electrode, the first and second electrodes being spaced apart and positioned between the first and second substrates;
means for interior containing electrolyte between the first and second substrates;
means for separating the first electrode and the second electrode within the interior containing means;
electrolyte, having ions, within the interior containing means and in contact with the first and second electrodes, the separating means having micromachined etched means for permitting the ions to pass through the separating means.

16. The super-capacitor as defined by claim 15 wherein the permitting means comprises a plurality of micromachined etch holes through the separating means.

17. The super-capacitor as defined by claim 15 wherein each of the first and second electrodes comprises a porous solid material.

18. The super-capacitor as defined by claim 17 wherein each of the first and second electrodes comprises a plurality of graphene monolayers.

19. The super-capacitor as defined by claim 15 wherein the electrolyte comprises a cured gel electrolyte.

20. The super-capacitor as defined by claim 15 wherein the separating means is formed from a material that is substantially ion impermeable to the ions of the electrolyte.

* * * * *

UNITED STATES PATENT AND TRADEMARK OFFICE
CERTIFICATE OF CORRECTION

PATENT NO.        : 9,601,278 B2
APPLICATION NO.   : 14/492376
DATED             : March 21, 2017
INVENTOR(S)       : Jiang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 85 days.

Signed and Sealed this
Twenty-fifth Day of September, 2018

Andrei Iancu
*Director of the United States Patent and Trademark Office*